United States Patent [19]

Sadler et al.

[11] Patent Number: 5,046,757
[45] Date of Patent: Sep. 10, 1991

[54] AIR BAG RESTRAINT SYSTEMS

[75] Inventors: Stephen J. Sadler, Nuneaton; David Coleman, Solihull; Stanley Edge, Moseley, all of England

[73] Assignees: Jaguar Cars Limited; Sheller-Clifford Limited, both of England

[21] Appl. No.: 591,543

[22] Filed: Oct. 1, 1990

Related U.S. Application Data

[62] Division of Ser. No. 420,142, Oct. 11, 1989, Pat. No. 4,960,292.

[30] Foreign Application Priority Data

Nov. 1, 1988 [GB] United Kingdom ............... 8825540

[51] Int. Cl.⁵ ............................................. B60R 21/16
[52] U.S. Cl. .................................................. 280/731
[58] Field of Search ............... 280/728, 730, 731, 732, 280/734, 735; 200/61.45 R

[56] References Cited

U.S. PATENT DOCUMENTS 4,167,276  9/1979  Bell et al. .
4,666,182  5/1987  Breed .

FOREIGN PATENT DOCUMENTS 3234422  9/1982  Fed. Rep. of Germany .
2374188  12/1977  France .
2559584  2/1985  France .

OTHER PUBLICATIONS

Patent Abstracts of Japan vol. 13, No. 25 (M-787)(3373) Jan. 20, 1989, & JP-A-63 235144 (Honda Motor Co. Ltd) Sep. 30, 1988.
Patent Abstracts of Japan vol. 13, No. 296 (M 846) Jul. 10, 1989, & JP-A-01 085855 (Honda Motor Co. Ltd) Mar. 30, 1989.

Primary Examiner—Charles A. Marmor
Assistant Examiner—Tamara L. Finlay
Attorney, Agent, or Firm—Davis, Bujold & Streck

[57] ABSTRACT

An air bag restraint system has an air bag module located centrally of a steering wheel and secured with respect thereto by at least one fastener, the air bag module including an inflator and a screw for arming the inflator, an interlock is associated with the screw which will prevent release of the fastener until the inflator has been disarmed and will provide an indication of whether the inflator is armed or not.

8 Claims, 2 Drawing Sheets

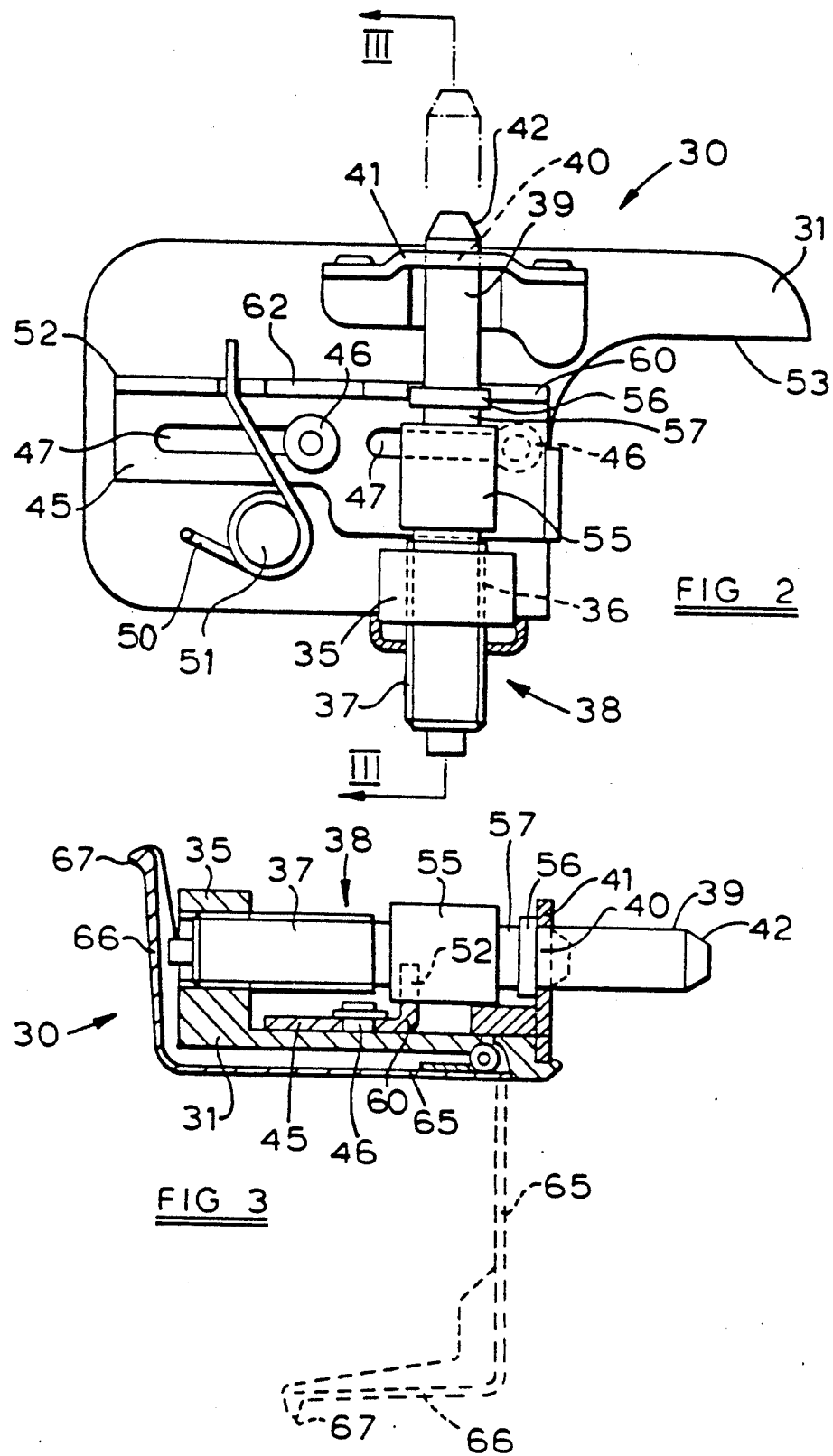

AIR BAG RESTRAINT SYSTEMS

BACKGROUND TO THE INVENTION

This is a Divisional Application of U.S. Ser. No. 07/420,142 filed 10-11-89, now U.S. Pat. No. 4,960,292.

The present invention relates to air bag restraint systems for motor vehicles and in particular to air bag restraint systems in which an air bag module with mechanical trigger is located in the boss of the steering wheel of the vehicle.

It is proposed to mount an air bag module of a restraint system for a motor vehicle in the boss of the vehicle's steering wheel, so that in a collision, the air bag will be deployed in front of the driver to prevent the driver coming into contact with the steering wheel or windscreen. The air bag module comprises an inflator which includes a pyrotechnic device, a trigger mechanism which in a collision will initiate a fast burn process to rapidly produce large volumes of gases which will inflate the air bag. For safety reasons, the inflator has a spring loaded plunger which must first be depressed to arm the inflator before it can be triggered. This is achieved by an arming screw, which engages an inclined face on the plunger, so that as the arming screw is tightened, the plunger will be depressed.

For maintenance purposes, it is occasionally necessary to remove the air bag module and/or steering wheel. When doing so, the inflator should be first disarmed by unscrewing the arming screw. The present invention provides an interlock mechanism to ensure that the inflator is disarmed before removal of the air bag module and/or steering wheel and re-armed when the steering wheel and/or air bag module are re-fitted.

SUMMARY OF THE INVENTION

According to one aspect of the present invention, an air bag restraint system comprises an air bag module adapted to be located centrally of a steering wheel and secured with respect thereto by at least one fastening means, said air bag module including an inflator and screw means for arming said inflator, interlock means being associated with said screw means which will, prevent release of said fastening means until the inflator has been disarmed and provide an indication of whether the inflator is armed or not.

BRIEF DESCRIPTION OF THE DRAWINGS

An embodiment of the invention is now described, by way of example only, with reference to the accompanying drawings, in which:

FIG. 2 is a plan view of the arming mechanism used in the embodiment illustrated in FIG. 1; and FIG. 3 is a section along the line III—III of FIG. 2.

DESCRIPTION OF A PREFERRED EMBODIMENT

Figure 1:
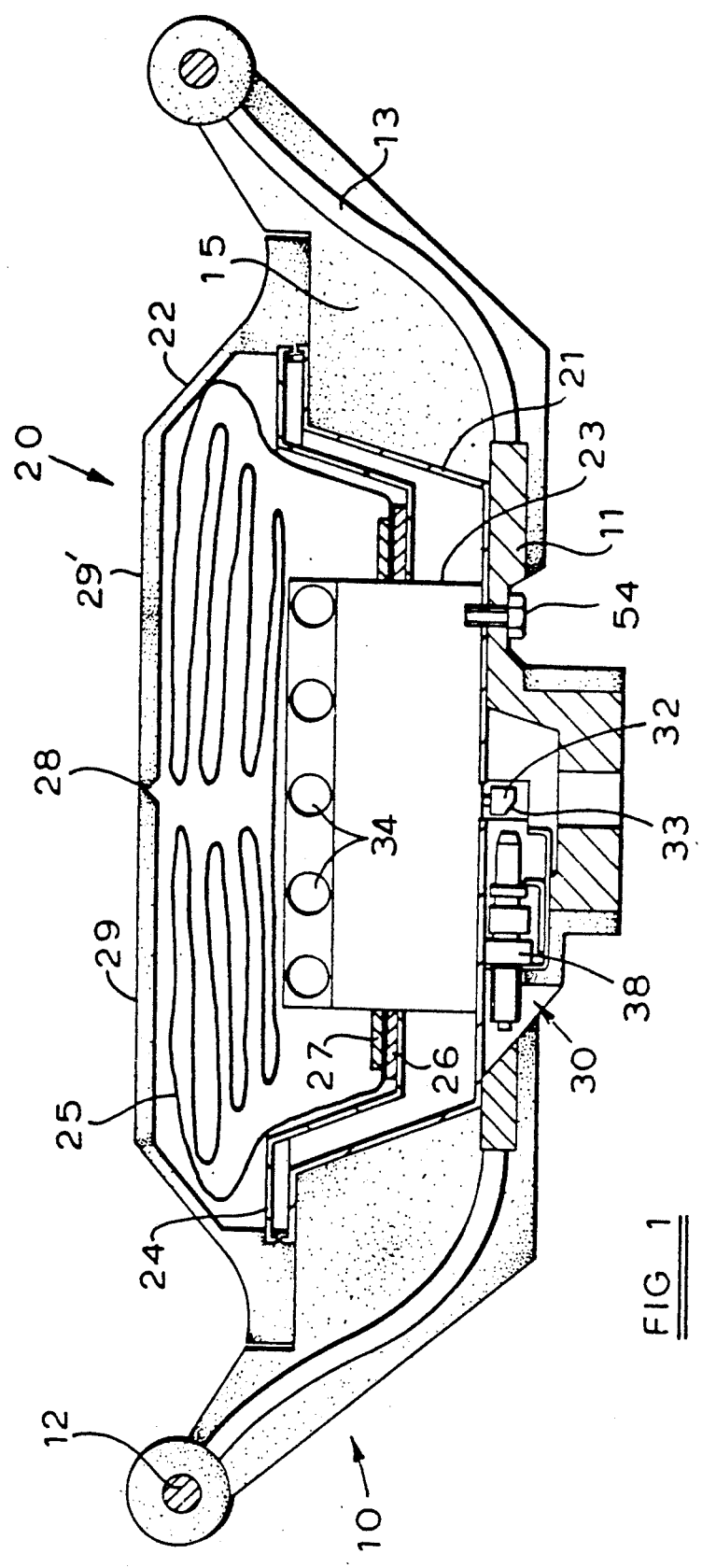
FIG. 1 is a cross-sectional elevation through a steering wheel/air bag module formed in accordance with the present invention.

As illustrated in FIG. 1, a steering wheel 10 comprises of central boss 11 with a rim 12 supported thereon by armatures 13. The boss 11, rim 12 and armatures 13 are embodied in a resilient foam material and a suitable covering material. A moulded padded central portion 15, which overlays the armatures 13 is formed centrally of the steering wheel 10 and provides a location for an air bag module 20.

The air bag module 20 comprises a backing plate 21 in the form of a dished pressing. A cover 22 is moulded to the outer periphery of the backing plate 21. An inflator 23 is mounted centrally of the backing plate 21 and a support pressing, the outer periphery of which is embedded in the moulded cover 22, surrounds the inflator 23. An air bag 25 is clamped to the pressing 24 between a pair of rings 26 and 27, the air bag 25 being folded within the space between the the support pressing 24 and cover 22. The cover 22 is made of a flexible material, for example rubber, and is formed with grooves 28 in its inner surface to provide weakened lines, which will split on inflation of the air bag 25 to permit deployment of the air bag 25. Preferably, the grooves 28 will define two flat formations 29 and 29', which hinge away from centre line defined by groove 28.

The inflator 23 has a series of peripheral holes 34 adjacent the end enclosed in the air bag 25, these holes allowing gases generated within the inflator 23 to expand into the air bag 25. The gasses are generated upon fast burn of a pyrotechnic device, when triggered by inertia means. Before the device can be triggered, a spring loaded plunger 32 must be depressed to arm the inflator 23.

The air bag module 20 is retained within the central portion 15 of steering wheel 10 by means of three fixing bolts 54 which pass through the boss 11 and engage the backing plate 21.

An arming mechanism 30 is secured in a recessed portion of the boss 11. As illustrated in greater detail in FIGS. 2 and 3, the arming mechanism comprises a base plate 31. A lug 35 is provided on the base plate 31 centrally of one edge thereof and has a threaded aperture 36 in which is located a correspondingly threaded portion 37 of an arming screw 38. The other end of the arming screw 38 has a shank portion 39 which slidingly locates through an aperature 40 in a bracket 41 secured adjacent the opposite edge of the base plate 31. The end of the shank portion 39 has a circumferential chamfer 42.

A slide 45 is located between the lug 35 and bracket 41 by means of a pair of rivets 46, said rivets 46 engaging in elongated holes 47 in the slide 45, thereby permitting movement of the slide 45 transverse to the axis of the arming screw 38. A spring element 50 is located on a boss 51 on the base plate 31 and acts against a flange formation 52 on the slide 45, to urge the slide 45 from one side of the arming screw 38 towards the other. The base plate 31 has a cutaway portion 53 on said other side of the arming screw 38.

Intermediate of the threaded portion 37 and shank portion 39, the arming screw 38 has an enlarged diameter portion 55 adjacent threaded portion 37 and a collar 56 separated from the portion 55 by a circumferential grooved portion 57. The collar 56 while being of greater diameter than the shank portion 39 is smaller in diameter than the portion 55. The grooved portion 57 is slightly wider than the thickness of the flange formation 52 and is of the same diameter as the shank portion 39.

The flange formation 52 is generally of a height slightly less than the separation between the base plate 31 and the bottom of groove 57 on arming screw 38. The end portion 60 of flange formation 52 is however of reduced height, so that this portion is a clearance fit between the base plate 31 and the periphery of collar 56. A part spherical recess 62 is also provided in the flange formation 52 at a position which will be aligned with the axis of the arming screw 38, when the slide 45 is hard over to the right, said recess 62 providing a clearance for the enlarged diameter portion 55 of the arming screw 38.

A cover plate 65 is pivotally attached to the base plate 31 along the edge adjacent bracket 41 on the opposite side of the base plate 31 to the arming screw 38. The cover plate 65 has a flange formation 66 which when the cover plate 65 is closed will overly the lug 35 to prevent access to the arming screw 38. A lip formation 67 on flange formation 66 is adapted to engage a complimentary formation on the steering wheel 10 to retain the cover plate 65 in the closed position.

The arming mechanism 30 is adapted to be mounted with the cover 65 outermost, to the rear side of the boss 11, the cutaway portion 53 of base plate 31 overlying one of the fixing bolts 54 and the arming screw 38 being radially aligned with the plunger 32 of inflator 23.

With the arming mechanism disclosed above, during assembly of the air bag module 20 into the steering wheel 11, the arming screw 38 will be fully withdrawn and slide 45 held over to the left as illustrated in FIG. 1, the collar 56 on arming screw 38 engaging the shoulder defining portion 60 of flange formation 52. After the steering wheel has been fastened to the steering column through boss 11, the air bag module 20 may be secured to the steering wheel, one of the fixing bolts 54 being accessible through the cutaway portion 53 of base plate 31. The arming screw 38 may then be screwed inwardly until collar 56 is clear of the flange formation 52 which is then aligned with the circumferential groove 57, so that the slider 45 can slide past the arming screw 38, under the influence of the spring 50 until the slider 45 overlays the fixing bolt 54. The arming screw 38 may then be screwed up, the larger portion 55 engaging in recess 62 and the chamfered end 42 of the arming screw 38 engaging an inclined face 33 on the plunger 32 thereby depressing the plunger 32 and arming the inflator 23. If the fixing bolt 54 is not first fully tightened, the slide 45 will foul bolt 54 and cannot move fully to the right and hence the recess 62 will not be aligned with the arming screw 38 and abutment of portion 55 of arming screw 38 with the flange formation 52 will prevent further tightening of the arming screw 38 and arming of the inflator 23. The flange formation 66 on cover plate 65 will only clear the arming screw 38 when it is fully tightened and the inflator 23 armed. Cover plate 65 can consequently only be closed when the inflator 23 is armed. If the cover plate 65 is not closed when steering wheel 10 is rotated, the cover plate 65 will foul the steering column cowl thus providing an audible as well as visual indication that the inflator 23 is not correctly armed.

When the inflator 23 is armed as described above, engagement of portion 55 of the arming screw 38 in the recess 62 of flange formation 52 will prevent the slide 45 from being moved. Consequently the fixing bolt 54 cannot be released to remove the air bag module 20. In order to remove the air bag modual 20, the cover plate 65 must first be opened and the arming screw 38 fully unscrewed thus disarming the inflator 23. When the arming screw 38 is fully unscrewed, the flange formation 52 is aligned with shank portion 39 and is free to move under the arming screw 38. The slide 45 may then be moved clear of the fastening bolt 54 and the arming screw tightened by a few turns to bring collar 56 into alignment with flange formation 52, thereby retaining slide 45 clear of the fixing bolt 54 which may then be released.

I claim:

1. An air bag restraint system comprising; an air bag module adapted to be located centrally of a steering wheel and secured with respect thereto by at least one fastening means, said air bag module including an inflator and screw means for arming said inflator; a slide which is moveable between a first position in which it is clear of said fastening means and a second position in which it prevents release of said fastening means, said slide being resiliently loaded from its first position to its second position and a first formation being provided on the screw means to engage a complimentary formation on the slide to lock the slide in its second position when the inflator is armed; means being provided to give an indication of the inflator being armed and disarmed.

2. An air bag restraint system according to claim 1 in which in said second position, the slide overlays said fastening means.

3. An air bag restraint system according to claim 1 in which a second formation on said screw means engages a complimentary formation on the slide to hold the slide in its first position, when the inflator is disarmed.

4. An air bag restraint system according to claim 3 in which said first and second formations on the slide and the complimentary formations on said screw means are arranged to engage sequentially as said screw means is screwed up to arm the inflator, there being an intermediate position at which neither formation engages its complimentary formation when the slide is free to move from its first to its second position.

5. An air bag restraint system according to claim 1 in which the slide is free to move from its second position to its first position when said screw means is fully unscrewed and the inflator disarmed.

6. An air bag restraint system according to claim 1 in which the slide is arranged to move transverse to the axis of said screw means, said slide having a longitudinal flange formation, a collar formation on said screw means being adapted to engage a portion of the flange formation of reduced height, when the slide is in its first position and the inflator is disarmed; and an enlarged diameter portion of said screw means being adapted to engage in a part circular recess in the flange formation when the slide is in its second position and the inflator is armed, a circumferential groove being provided between the collar and enlarged diameter portion of said screw means, said groove permitting movement of the flange formation past said screw means as said screw means is screwed to arm the inflator.

7. An air bag restraint system according to claim 1 in which a cover plate is provided to prevent access to said screw means when the inflator is armed.

8. An air bag restraint system according to claim 1 in which a formation on said cover plate engages said screw means when the inflator is disarmed, in order to prevent closure of the cover plate.

* * * * *